US009161230B2

(12) United States Patent
Marque-Pucheu

(10) Patent No.: US 9,161,230 B2
(45) Date of Patent: Oct. 13, 2015

(54) MANAGEMENT OF ASYMMETRIC COMMUNICATION FREQUENCY CHANNELS IN A RADIO COMMUNICATION SYSTEM

(75) Inventor: Gérard Marque-Pucheu, Verneuil sur Seine (FR)

(73) Assignee: Cassidian SAS, Elancourt (FR)

( * ) Notice: Subject to any disclaimer, the term of this patent is extended or adjusted under 35 U.S.C. 154(b) by 0 days.

(21) Appl. No.: 14/131,149

(22) PCT Filed: Jul. 4, 2012

(86) PCT No.: PCT/EP2012/002805
§ 371 (c)(1),
(2), (4) Date: Jan. 6, 2014

(87) PCT Pub. No.: WO2013/004374
PCT Pub. Date: Jan. 10, 2013

(65) Prior Publication Data
US 2014/0141787 A1   May 22, 2014

(51) Int. Cl.
*H04W 16/02* (2009.01)
*H04W 76/00* (2009.01)
*H04W 72/00* (2009.01)
*H04W 72/04* (2009.01)

(52) U.S. Cl.
CPC ............ *H04W 16/02* (2013.01); *H04W 72/005* (2013.01); *H04W 76/002* (2013.01); *H04W 72/0453* (2013.01); *H04W 76/005* (2013.01)

(58) Field of Classification Search
CPC . H04W 16/02; H04W 76/002; H04W 72/005; H04W 4/10; H04W 76/005
See application file for complete search history.

(56) References Cited

U.S. PATENT DOCUMENTS

| 6,233,229 | B1 * | 5/2001 | Ranta et al. | 370/330 |
|---|---|---|---|---|
| 6,535,748 | B1 * | 3/2003 | Vuorio et al. | 455/552.1 |
| 2006/0009243 | A1 * | 1/2006 | Dahan et al. | 455/466 |
| 2007/0265015 | A1 * | 11/2007 | Lagerman | 455/452.1 |
| 2010/0067458 | A1 * | 3/2010 | Tanigawa et al. | 370/329 |
| 2011/0044222 | A1 * | 2/2011 | Gerstenberger et al. | 370/311 |

FOREIGN PATENT DOCUMENTS

EP   1715700 A1   10/2006

OTHER PUBLICATIONS

European International Search Report application No. PCT/EP2012/002805 reported on Aug. 13, 2012.
(Continued)

*Primary Examiner* — Kashif Siddiqui
*Assistant Examiner* — Minjung Kim
(74) *Attorney, Agent, or Firm* — Miller, Matthias & Hull LLP

(57) ABSTRACT

A radio communications system comprising a plurality of cells, each containing a base station and mobile terminals. Said system is able to manage group communications between different mobile terminals, allocating during the establishment of a group communication for each cell an uplink channel contained in an uplink carrier frequency and a downlink channel contained in a downlink carrier frequency. The system is able to manage a number of downlink channels per downlink carrier frequency strictly greater than a number of uplink channels per uplink carrier frequency.

12 Claims, 4 Drawing Sheets

(56) References Cited

OTHER PUBLICATIONS

Panasonic: "Support of UL/DL asymmetric carrier aggregation", 3GPP Draft; R1-082999, 3rd Generation Partnership Project (3GPP), Mobile Competence Centre ; 650, Route Des Lucioles ; F-06921 Sophia-Antipolis Cedex ; France, no. Jeju; Aug. 12, 2008, XP050316462, sections 1 et 2 figure 1b.

CATT: Physical cell ID in carrier aggregation, 3GPP Draft; R1-100016, 3rd Generation Partnership Project (3GPP), Mobile Competence Centre ; 650, Route Des Lucioles ; F-06921 Sophia-antipolis Cedex ; France, vol. RAN WG1, no. Valencia, Spain; Jan. 18, 2010, Jan. 12, 2010, XP050417772, sections 1 et 2 figure 1.

* cited by examiner

MANAGEMENT OF ASYMMETRIC COMMUNICATION FREQUENCY CHANNELS IN A RADIO COMMUNICATION SYSTEM

CROSS-REFERENCE TO RELATED APPLICATIONS

This application is a 35 USC §371 U.S. national stage filing of International Patent Application No. PCT/EP2012/002805 filed on Jul. 4, 2012, which claims priority under the Paris Convention and 35 USC §119 to French Patent Application No. 11 02126, filed on Jul. 6, 2011.

FIELD OF THE DISCLOSURE

The present invention relates in a general manner to a radio communications system managing asymmetric communication frequency channels used in particular during group communications. Such a radio communications system is implemented in particular in PMR (private mobile radio) type networks.

BACKGROUND OF THE DISCLOSURE

Generally, cellular radio communications networks comprise several cells each including a base station and mobile terminals. A communication between a base station and a mobile terminal is carried out by means of two communication channels: a communication channel in the uplink direction so that the terminal communicates to the base station and a communication channel in the downlink direction so that the base station communicates with the terminal. In a cell, a communication channel in the uplink direction and a communication channel in the downlink direction for a same communication are generally symmetrical. In fact, these communication channels have a same pass band width, a same modulation and thus have consequently a same data rate. In addition, the communication channels are matched initially, in other words for a communication channel in the uplink direction corresponds a communication channel in the downlink direction, the carrier frequencies comprising respectively said channels being separated by a duplex gap generally fixed in the frequency band dedicated to the network.

Cellular radio communications networks are subdivided into public networks and private networks using different technologies.

A large part of voice communications in public networks are simultaneous communications from one subscriber to another subscriber. Such a communication may be divided into two sub-communications, a sub-communication corresponding to a communication in a same cell between a terminal of a subscriber and a base station.

In a different manner, voice communications in private networks are mainly group communications in which each member of the group via his mobile terminal speaks in turn in addressing the other members of the group. The different members of the group may be spread out over a geographic area including several cells, in general adjacent. In each cell, is allocated for a communication, a pair of communication channels comprising an uplink communication channel and a downlink communication channel that are matched and symmetrical. A member of the group who speaks, uses his mobile terminal to communicate his message to the base station of the cell in which it is located, by means of an uplink communication channel. The base station of the cell and the other base stations of the cells covering the communication group retransmit the message to the other mobile terminals of the group by means respectively of downlink communication channels. In a group communication covering several cells, the uplink communication channels are statistically less used than the downlink communication channels, by a factor approximately equal to the number of cells covering the group communication, implying as a result an asymmetric communication traffic. The asymmetry of the communication traffic of private communication networks using pairs of matched and symmetrical uplink and downlink communication channels do not make it possible to optimise the spectral efficiency of the network. In fact, in certain communication technologies, such as the technology linked to the TETRA ("TErrestrial Trunked Radio") standard, for a transmission of a message a single uplink communication channel is used, the other uplink communication channels not used allocated to the same group communication are reserved because matched to the downlink channels also allocated to the same group communication, preventing the use of said uplink channels by other group communications.

SUMMARY OF THE DISCLOSURE

The objective of the invention is to improve the spectral efficiency of private radio communications networks by a radio communication system allocating for each group communication asymmetric communication frequency channels between the uplink direction and the downlink direction.

To attain this objective, a radio communications system comprising a plurality of cells, each containing a base station and mobile terminals, said system being able to manage group communications between different mobile terminals, allocating during the establishment of a group communication for each cell an uplink channel contained in an uplink carrier frequency and a downlink channel contained in a downlink carrier frequency, characterised in that it is able to manage a number of downlink channels per downlink carrier frequency strictly greater than a number of uplink channels per uplink carrier frequency.

The invention thus makes it possible to improve in a first embodiment the spectral efficiency of downlink frequencies in order to manage several group communications in a same cell without increasing the difficulty of implementation of such a system and thus reducing the costs incurred for the embodiment of such a system.

According to any of the following characteristics:
the downlink carrier frequency has a wider bandwidth than the uplink carrier frequency;
the system comprises in each base station at least one modulator modulating each downlink carrier frequency according to a multicarrier modulation encoding a number of bits per symbol higher than a number of bits per encoded symbol according to a modulation carried out on an uplink carrier frequency by at least one modulator of a mobile terminal;
the number of uplink carrier frequencies received by each base station is greater than the number of downlink carrier frequencies transmitted by each base station, each base station using a reception diversity system;
the system comprises a switch connected to each base station of the radio communications system to allocate dynamically during the establishment of a group communication in each cell covering the group communication an uplink channel contained in an uplink carrier frequency and a downlink channel contained in a downlink carrier frequency;

The invention also makes it possible to improve in the second and third embodiments the spectral efficiency of uplink frequencies in order to avoid any limitation of establishment of group communication for communications in the uplink direction.

The invention also relates to a mobile terminal and a base station of the radio communications system.

The invention also relates to a method of allocation of at least one uplink channel and one downlink channel during an establishment of a group communication in a radio communications system, the radio communications system comprising a plurality of cells containing respectively a plurality of base stations connected to a switch, and containing respectively mobile terminals. The method is such that it comprises the following steps processed by the switch:

a reception of a request for establishment of a group communication from a mobile terminal of the network, an allocation, for each cell covering the group communication, of an uplink channel comprised in an uplink carrier frequency selected according to a first specific reuse pattern, an allocation, for each cell covering the group communication, of a downlink channel comprised in a downlink carrier frequency selected according to a second specific reuse pattern, the downlink carrier frequency comprising a number of downlink channels strictly greater than the number of uplink channels contained in the uplink carrier frequency, a matching of the uplink channel and of the downlink channel in each cell throughout the whole group communication, and a mismatching of the uplink channel and of the downlink channel at the end of the group communication.

According to any of the following characteristics:

the downlink channel allocated and the downlink carrier frequency selected for the group communication are identical for all cells belonging to a same downlink iso-frequency plane covering a part of the group communication, and are different for cells belonging to different downlink iso-frequency planes covering the group communication the second frequency reuse pattern is established according to a given number of downlink iso-frequency planes, according one embodiment, the uplink channel allocated and the uplink carrier frequency selected for the group communication are identical for all cells belonging to a same uplink iso-frequency plane covering a part of the group communication, and are different for cells belonging to different uplink iso-frequency planes covering the group communication and the first frequency reuse pattern is established according to a given number of uplink iso-frequency planes, according another embodiment, the uplink channel allocated and the uplink carrier frequency selected for the group communication are different for all adjacent cells covering the group communication, the first frequency reuse pattern containing a number of cells less than the number of cells of a conventional TETRA type frequency reuse pattern.

BRIEF DESCRIPTION OF THE DRAWINGS

Other characteristics and advantages of the present invention will become clearer on reading the following description of several embodiments of the invention given as non limiting examples, with reference to the corresponding appended drawings in which.

DETAILED DESCRIPTION OF THE DISCLOSURE

Figure 1:
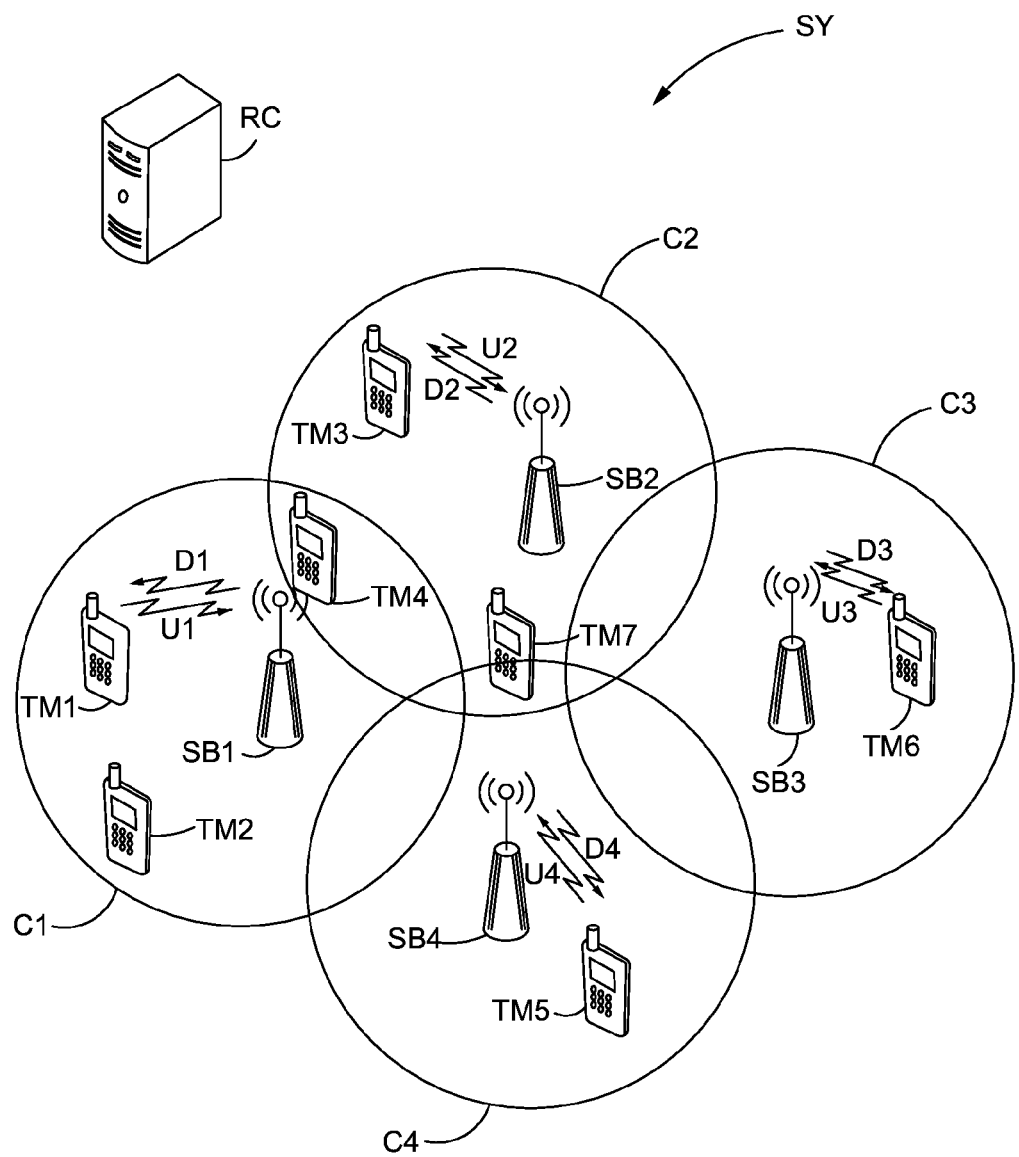
FIGS. 1 and 2 show schematically a radio communications system according to the invention.

For reasons of clarity, only components essential for the understanding of the invention have been represented, and without respect of scale and in a schematic manner.

The invention considers the asymmetry of the traffic of group communications to increase the number of group communications, which can be managed simultaneously in a cellular radio communications network while taking into account the asymmetric characteristics of the uplink channel and of the downlink channel for a group communication in a given cell.

A radio communications network according to the invention, also known as radio communications system, comprises several cells. Each cell of the network comprises a base station and mobile terminals. Each base station comprises N1 transmitters to transmit signals to the terminals on N1 different frequency channels called downlink carrier frequencies, in other words from the base station to the terminals. Each base station also comprises N2 receivers to receive signals from terminals of the cell via N2 different frequency channels, called uplink carrier frequencies, in other words from a terminal to the base station. N1 and N2 are positive integers that can be equal or different. A carrier frequency supports several communication channels allocated to different communications. One understands by communication channel in a carrier frequency either a frequency sub-band of the carrier frequency according to FDMA Access (Frequency Division Multiple Access), or a time interval of the carrier frequency according to TDMA Access (Time Division Multiple Access). A communication channel in the uplink direction, also called uplink channel, is included in an uplink carrier frequency and transports a voice message for an uplink traffic channel or a control message for an uplink control channel, from a mobile terminal localised in a cell of the network to the base station of the cell. A communication channel in the downlink direction, also called downlink channel, is included in a downlink carrier frequency and transports a voice message for a downlink traffic channel or a control message for a downlink control channel, from the base station of a cell to at least one mobile terminal of the cell. The set of base stations is managed by at least one switch that allocates the carrier frequencies thereof.

The radio communications network is able to manage group communications. A group communication is a series of transmissions of voice messages between several mobile terminals forming a communication group. Mobile terminals of a same group communication may be spread out over several often adjacent cells of the network. During a group communication, the members of the group speak in turn to transmit a message by means of their mobile terminals. The traffic of a group communication is asymmetric, thereby signifying that for a transmission of a message from a mobile terminal to the other mobile terminals of the group, a single uplink channel is used in a cell and all the downlink channels are used in all the cells covering the communication group. Generally in each cell, at an instant of communication, the downlink channels cover more different group communications than the uplink channels. Thus, in each cell of the radio communications system, a downlink channel and an uplink channel are allocated, at the establishment of a group communication, and are matched for the entire group communication. At the end of the group communication, the uplink channel and the downlink channel are no longer matched and become available separately or not for other group communications. Such an allocation of communication channels is called dynamic allocation unlike a conventional allocation in which the allocation of an uplink channel is also allocated the corresponding downlink channel separated in the frequency band of the uplink channel by a fixed duplex gap.

In the radio communications system SY illustrated in FIG. 1 are uniquely represented four cells C1 to C4 including respectively four base stations SB1 to SB4 and several mobile terminals per cell. The system comprises other cells not represented. The base stations of the network are connected to a switch RC which dynamically allocates an uplink channel and a downlink channel for each group communication in each base station participating in the group communication. The switch also retransmits the voice messages between said base stations. Two groups of communication are illustrated in FIG. 1. A first communication group is formed of mobile terminals TM1, TM2, TM3. A second communication group is formed of mobile terminals TM4, TM5, TM6, TM7. It is obvious that the radio communications network can cover more than two groups of communication per cell. In the following, reference will be made more particularly to the example of the first group of communication, knowing that the other groups of communication operate in an identical manner. At the establishment of the first group of communication, the downlink channels D1, D2, D3 and D4 are allocated respectively to the cells C1, C2, C3 and C4, and the uplink channels U1, U2, U3 and U4 are allocated respectively to the cells C1, C2, C3 and C4. According to the invention, for a same group communication, the downlink channels D1, D2, D3 and D4 may be identical in a fixed group of adjacent cells, known as downlink iso-frequency plane. According to one of the embodiments of the invention described hereafter for communications in the uplink direction, for a same group communication the uplink channels U1, U2, U3 and U4 may be identical in a fixed group of adjacent cells, also called uplink iso-frequency plane.

Thus, in order to increase the spectral efficiency of the radio communications network by taking into account the asymmetry of the communication traffic, one of the innovative characteristics of the invention relates to an asymmetry between the uplink channels and the downlink channels. More particularly, the carrier frequencies respectively of the uplink channels and the downlink channels are not symmetrical. The number of downlink channels for a downlink carrier frequency is strictly greater than the number of uplink channels for an uplink carrier frequency.

Figure 2:
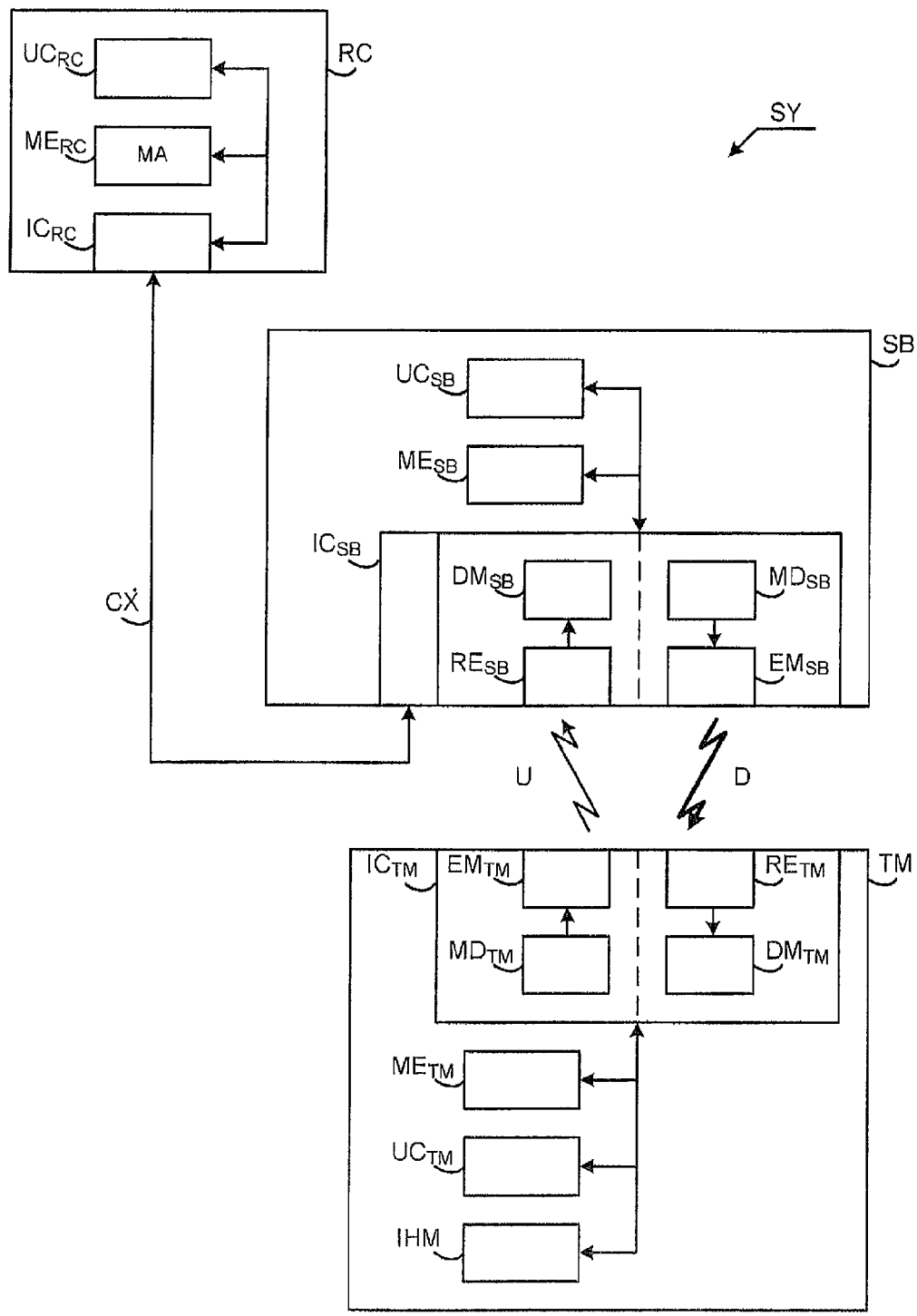

Such an asymmetry of uplink channels and downlink channels implies a different management for the transmission and the reception of said channels in the base stations and the mobile terminals. FIG. 2 illustrates a base station SB connected to a switch RC and communicating with a mobile terminal TM of the radio communications network according to the invention. The switch RC, the base station SB and the terminal TM are represented in the form of simplified block diagrams. The switch RC comprises a control unit $UC_{RC}$, a series of memories $ME_{RC}$, a communication interface $IC_{RC}$. The base station SB comprises a control unit $UC_{SB}$, a series of memories $ME_{SB}$, a communication interface $IC_{SB}$. The mobile terminal TM comprises a control unit $UC_{TM}$, a series of memories $ME_{TM}$ and a communication interface $IC_{TM}$. The mobile terminal also comprises a human-machine interface IHM enabling the user of the mobile terminal to communicate and to receive information. The human-machine interface IHM comprises for example a display screen, a keyboard, a microphone and a loudspeaker. All of these units $UC_{RC}$, $ME_{RC}$, $IC_{RC}$, $UC_{SB}$, $ME_{SB}$, $IC_{SB}$, $UC_{TM}$, $ME_{TM}$, $IC_{TM}$ and IHM are represented in the form of functional blocks, most of which ensure functions having a link with the invention and may correspond to software and/or hardware modules.

The control units $UC_{RC}$, $UC_{SB}$ and $UC_{TM}$ respectively of the switch RC, the base station SB and the mobile terminal TM each comprise at least one microprocessor to run the different software and programmes memorised in the respective memories $ME_{RC}$, $ME_{SB}$ and $ME_{TM}$. The memories $ME_{RC}$, $ME_{SB}$ and $ME_{TM}$ may be volatile or non volatile memories, for example EEPROM, ROM, PRM, RAM, DRAM, SRAM, microprogramme, programmable logic and typically memorise contents, data or similar. In addition, the memories can memorise computer programme codes, for example the programme codes for operating systems. The memories may be, for example, with random access, or a hard disk, or a combination of said means. In addition, the memories may be removable or detachable memories connected to the respective control unit.

The memories of the switch comprise a module MA for dynamic allocation of communication channels. The module MA may correspond to software or a programme memorised in the memories $ME_{RC}$ and run by the control unit $UC_{RC}$.

The communication interface $IC_{RC}$ of the switch comprises a connection CX, wireless or not, with the communication interface $IC_{SB}$ of the base station SB. The communication interface $IC_{RC}$ of the switch RC comprises other connections, wireless or not (not represented), with the other communications interfaces of the base stations of the radio communications network. By means of said connection CX, the switch can exchange with the base station SB control messages in order to allocate communication channels during the establishment of a group communication. By means of said connections to the base stations, the switch RC also makes it possible to transfer voice messages from a base station to the other base stations participating in a same group communication.

The communication interface $IC_{SB}$ of the base station comprises the connection CX with the communication interface $IC_{RC}$ of the switch RC. The communication interface $IC_{SB}$ of the base station also comprises N1 transmitters to transmit N1 downlink carrier frequencies to the mobile terminals of the cell. The N1 carrier frequencies may not have the same data rate. A single transmitter $EM_{SB}$ is illustrated in FIG. 2. Each transmitter $EM_{SB}$ is connected to a modulator $MD_{SB}$ that modulates the corresponding carrier frequency so that it can comprise several downlink channels to transmit respectively voice message's of different group communications to the terminals of the cell. The communication interface of the base station may comprise other transmitters and associated modulators that carry out conventional modulations, for example of TETRA type, to transmit messages of individual communication between two mobile terminals. The communication interface $IC_{SB}$ of the base station comprises N2 radio receivers to receive N2 uplink carrier frequencies from the mobile terminals of the cell. A single receiver $RE_{SB}$ is illustrated in FIG. 2. Each receiver $RE_{SB}$ is connected to a demodulator $DM_{SB}$ that demodulates the corresponding uplink carrier frequency in order to recover voice or control messages comprised respectively in the uplink channels of the carrier frequency. To modulate/demodulate asymmetric carrier frequencies respectively in the downlink direction and in the uplink direction, the N1 modulators of the base station are not complementary to the N2 demodulators of the base stations. The base station transmits and receives radio signals by means of antenna. The base station may also be provided with a reception diversity system using a combination of radio signals of reception from antenna to carry out an optimal processing of the digital signals available according to the principle of "Maximum ratio combining".

The communication interface $IC_{TM}$ of the mobile terminal comprises a transmitter $EM_{TM}$ to transmit a voice or control message via an uplink carrier frequency to one of the receivers $RE_{SB}$ of the base station SB. The transmitter $EM_{TM}$ is connected to a modulator $MD_{TM}$ which modulates the uplink carrier frequency in order to include the message to transmit in an uplink channel allocated for a group communication. The communication interface $IC_{TM}$ of the mobile terminal comprises a radio receiver $RE_{TM}$, according to the invention, synchronised on one of the transmitters $EM_{SB}$ of the base station SB to receive a downlink carrier frequency comprising a voice or control message relative to a group communication. The receiver $RE_{TM}$ is connected to a demodulator $DM_{TM}$ which demodulates the downlink carrier frequency in order to recover the voice or control message inserted in the downlink channel allocated to the group communication. The mobile terminal also comprises a receiver synchronised on one of the transmitters of the base station SB to receive a downlink carrier frequency modulated according to a conventional modulation, for example of TETRA type, and comprising a voice or control message relative to an individual communication that can be established between the terminal and another terminal of the network. The receiver is connected to a demodulator to recover the message of the individual communication.

To process a same downlink carrier frequency, a modulator $MD_{SB}$ of the base station SB and a demodulator $DM_{TM}$ of the terminal TM are complementary. In the same way, to process a same uplink carrier frequency, the modulator $MD_{TM}$ of the mobile terminal TM and a demodulator $DM_{SB}$ of the base station SB are complementary.

The transmission and the reception of a downlink carrier frequency dedicated to group communications according to the invention requires a specific modulation of said frequency to increase the number of downlink channels in the carrier frequency. According to the invention, the carrier frequency is modulated according to a modulation having a higher bit rate with respect to the width of the carrier frequency. The modulator of the base station can modulate the carrier frequency according to a multicarrier modulation of OFDM (Orthogonal Frequency Division Multiplex) type where each of the sub-carriers of the carrier frequency is modulated according to a different multi-dimensional constellation making it possible to encode a higher number of bits per modulation symbol. A symbol is a time unit of the signal that carries information. An example of such modulation is modulation according to the TEDS (Tetra Enhanced Data Service) standard defined by the normalisation works of the TETRA project put in place by a working group of the ETSI (European Telecommunications Standards Institute) organisation. According to this modulation, a carrier frequency comprises a series of sub-carriers, for example 8 sub-carriers for a carrier frequency of bandwidth of 25 KHz, 16 sub-carriers for a carrier frequency of bandwidth of 50 KHz and so on. Each of the sub-carriers is encoded by symbols according to a specific rate, for example of 2400 bauds—in other words 2400 symbols per second. Each of the symbols is modulated by a specific quadrature amplitude modulation QAM grouping together a given number of bits per symbol. A symbol comprises 2 bits for a 4-QAM modulation, 4 bits for a 16-QAM modulation and 6 bits for a 64-QAM modulation. In order to ensure an optimal level of reception, the theoretical rate of 6 bits per symbol is reduced by the use of an error corrector code, such as a turbo code, comprising a half output, in other words one bit of useful information for two bits transmitted or a two thirds output, signifying two bits of useful information for three bits transmitted. The table below indicates the number of bits of useful information comprised in a time interval according to the TEDS standard for different carrier frequency widths, different combinations of modulation and error coding as well as the corresponding values of the signal to noise ratio C/I, also known as interferences, necessary for the correct operation of the corresponding modulation. From the number of bits of useful information, the number of voice frames may be deduced in a time interval, knowing that a communication channel comprises several voice frames. According to the TETRA standard, a communication channel time interval comprises two voice frames, each voice frame containing 137 bits of useful information.

TABLE 1

| Channel width | 4 QAM o = ½ | 4 QAM non-coded | 16 QAM o = ½ | 16 QAM non-coded | 64 QAM o = ½ | 64 QAM o = ⅔ | 64 QAM non-coded |
|---|---|---|---|---|---|---|---|
| 25 kHz | 185 | 370 | 389 | 800 | 593 | 797 | 1208 |
| 50 kHz | 421 | 842 | 861 | 1744 | 1301 | 1741 | 2624 |
| 100 kHz | 893 | 1786 | 1805 | 3632 | 2717 | 3629 | 5456 |
| 150 kHz | 1365 | 2730 | 2749 | 5520 | 4133 | 5517 | 8288 |
| Ratio C/I (dB) | 11.5 | — | 16.5 | — | 21.5 | 24.5 | — |

According to an example of Table 1, a downlink carrier frequency of 50 KHz width using a 64-QAM modulation with a two thirds error coding makes it possible to transmit 1741 bits per time interval. A time interval thus contains 12 voice frames, corresponding to 1741 bits divided by 137 bits per frame, the (1741−12×137=97) remaining bits being able to be used for signalling by means of control messages. The TETRA and TEDS standards correspond to $4^{th}$ order TDMA systems, in other words comprising 4 periodic time intervals per carrier frequency. Thus, the downlink carrier frequency contains 48 voice frames on 4 time intervals, in other words 24 communication channels corresponding to 48 frames divided by 2 frames per communication channel. In order to make a comparison, for a downlink carrier frequency according to the TETRA standard with a frequency width of 25 KHZ, a time interval corresponds to a communication channel. Such a carrier frequency then comprises 4 communication channels, which is clearly less than the 24 communication channels for the carrier frequency supporting the TEDS standard as described previously. A multicarrier modulation on downlink carrier frequencies makes it possible to increase the number of downlink communication channels and thus increase the spectral efficiency in the downlink direction of the communication.

The spectral efficiency in the downlink direction may also be improved by the addition of a specific frequency allocation in the downlink direction for each group communication. In fact, by using for a same group communication different downlink channels per adjacent cell covering said group communication, said downlink channels will only be able to be used in a simultaneous manner by other group communications in other cells of the radio communications network by respecting a large repetition distance between the cells using the same channels for different group communications. The reuse of communication channels, more particularly the reuse of carrier frequencies, in a conventional radio communications network respects a second specific pattern of frequency reuse, the factor of reuse of carrier frequencies depending on the protection signal over interference ratio (C/I) of the modulation used. A frequency reuse pattern corresponds to a series of adjacent cells in each of which are allocated carrier frequencies all different in a same cell and also in the cells of the reuse pattern. Such a pattern is repeated several times in the radio communications network. The greater the repetition distance between the cells, which implies a reuse pattern comprising a large number of cells, the less the communication channels are reused for other communications in the radio communications network.

Figure 3:
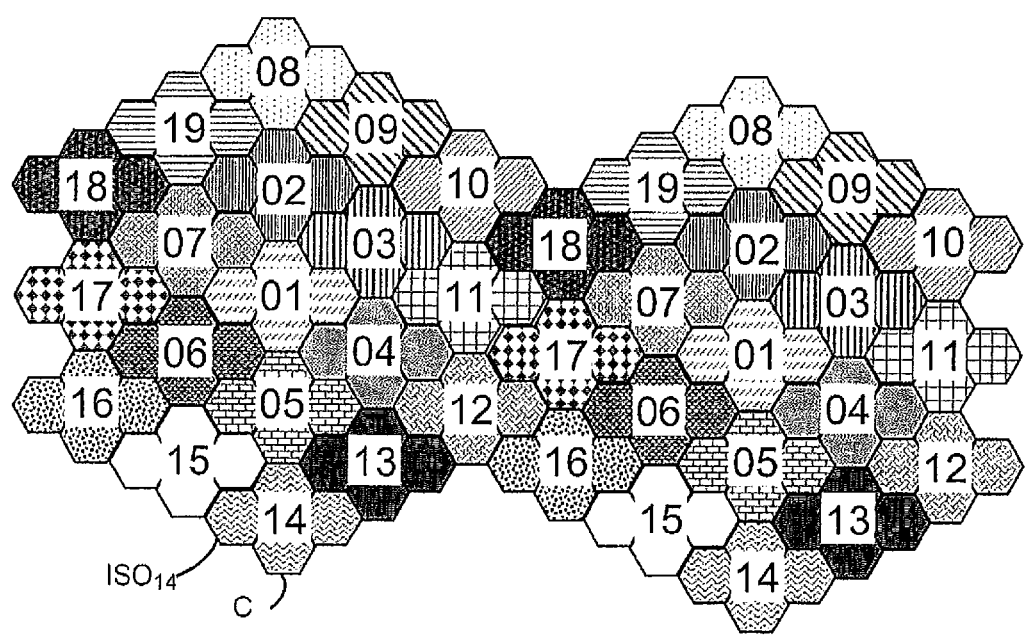
FIG. 3 is a diagram representative of frequency reuse pattern of iso-frequency planes.

According to the invention, for each downlink communication, the allocation of a downlink carrier frequency is the same for all the adjacent cells grouped together in a downlink iso-frequency plane as illustrated in FIG. 3. With reference to FIG. 3, for simplification, each iso-frequency plane ISO of the network comprises a same number of cells C, 4 cells per plane. This is not generally the case in practice since the size of the iso-frequency planes depends in general on geographic, topographic, user density conditions, etc. In each downlink iso-frequency plane, a same downlink channel is used for a same group communication in all the cells of the plane. A group communication may be covered by in general adjacent planes. In this case, one downlink channel per plane is allocated for the same communication. There is no interference of identical downlink channels between two cells of a same plane since they correspond to the same group communication and the transmissions in the downlink direction are synchronised in all of the cells of the plane. By reproducing a same frequency reuse pattern, for example of 19 planes per pattern, according to FIG. 3, and no longer per cell, the frequency repetition distance between two iso-frequency planes is much greater than the conventional frequency repetition distance between two cells. The interference between different group communications using a same communication channel on two iso-frequency planes separated by a frequency reuse distance is very low. The use of iso-frequency planes is optimal from the spectral point of view for group communications. However, the modulation of the downlink carrier frequencies must withstand multiple path situations. In fact, a same mobile terminal receives simultaneously the same signal from several base stations synchronous with the iso-frequency plane with different propagation times. The superposition of said signals creates multiple paths with a shift that can attain several tens of microseconds, which can exceed the demodulation capacities of a conventional demodulator in the terminal. In order for the demodulator of the mobile terminal according to the invention to withstand multiple path situations, the modulated carrier frequency must have quite a low modulation rate, enabling long time symbols to facilitate their processing by the demodulator.

To optimise the spectral efficiency in the downlink direction, at least one modulator of the base station performs a multicarrier modulation on a carrier frequency having a wide bandwidth encoding thus a number of bits per symbol higher than a number of bits per symbol encoded according to a modulation performed on an uplink carrier frequency by at least one modulator of a mobile terminal. Said modulation has the advantage of increasing the number of communication channels per carrier frequency but also enables the complementary demodulator of the mobile terminal receiving said carrier frequency to withstand multiple path situations thanks to the low modulation rate of each of the sub-carriers. Moreover, to improve the spectral efficiency in the downlink direction, the switch RC dynamically allocates the downlink carrier frequencies to the base stations according to a frequency reuse pattern based on downlink iso-frequency planes. The reuse pattern is memorised in the memories $ME_{RC}$ of the switch RC.

The use of an uplink carrier frequency equivalent to a downlink carrier frequency as proposed for the radio communications network according to the invention is very difficult in practice. In fact, such a carrier frequency comprising a very high number of communication channels on a single time interval requests to be processed correctly by a base station that implements complex multiplexing systems. By comparison, a mobile terminal receiving on the downlink carrier frequency for a time interval several communication channels is only going to process one of the channels dedicated to the group containing the terminal. Quite the reverse, the base station that receives on an uplink frequency for a time interval several communication channels needs to process all of the communication channels containing signals from numerous different terminals. Thus, for an uplink carrier frequency, the number of communication channels per time interval remains for reasons of simplicity of implementation strictly less than the number of communication channels per time interval in a carrier frequency in the downlink direction.

In a first embodiment of the invention for communications in the uplink direction, each modulator $MD_{TM}$ of the terminal modulates the uplink carrier frequency in a conventional manner. For example, the modulator applies a π/4-DQPSK modulation of the TETRA standard on the carrier frequency of 25 KHz band width. Thus, for such a modulation the carrier frequency comprises four uplink channels. The frequency plan is not modified, the switch allocates uplink carrier frequencies while respecting a first frequency reuse pattern respecting a given number of cells per frequency reuse pattern. The frequency plan and the first reuse pattern are memorised in the memories of the switch RC.

According to an example of this first embodiment, in a series of base stations each comprising conventionally three transmitters and three receivers of TETRA type, thus N1=N2=3, two of the conventional TETRA transmitters are replaced by a single $EM_{SB}$ transmitter of TEDS type. The $EM_{SB}$ transmitter transmits a carrier frequency of 50 kHz bandwidth and is connected to a modulator using TEDS 64-QAM modulation with 2/3 output encoding as presented previously with reference to Table 1. Each base station thus comprises in this example N1=2 transmitters including a conventional TETRA type transmitter with π/4-DQPSK modulation mainly dedicated to individual communications between two mobile terminals and the $EM_{SB}$ transmitter dedicated to group communications. To ensure a correct protection against interferences in the downlink direction, the switch allocates the downlink carrier frequencies according to a second reuse pattern relative to downlink iso-frequency planes. Thus, the cells are grouped together in downlink iso-frequency planes each formed of 4 cells, as indicated in FIG. 3. The switch allocates the downlink carrier frequencies according to a reuse pattern of 19 planes per pattern. On account of the lengthening of the frequency reuse distance, the criterion of signal to interference ratio (C/I) is verified.

Each base station also comprises N3=3 conventional TETRA type $RE_{SB}$ receivers using a π/4-DQPSK modulation. The switch RC allocates the uplink frequencies according to a first frequency reuse pattern of 19 cells per reuse pattern.

According to this example, each cell comprises 12 uplink channels corresponding to 3 uplink carrier frequencies of 25 KHz width with a π/4-DQPSK modulation, each supporting four communication channels. In the downlink direction, each downlink iso-frequency plane comprises 28 downlink channels corresponding to a first downlink carrier frequency of 50 KHZ width with a multicarrier modulation, the first frequency supporting 24 communication channels and a second downlink carrier frequency of 25 KHZ width with a π/4-DQPSK modulation, the second carrier frequency supporting four communication channels. It may be observed that, without modification of the frequency allocation in the uplink direction, the number of communications supported in the downlink direction is much greater than in the uplink direction. A bottleneck can appear for communications in the uplink direction if the mobile terminals belonging to each of the group communications wishes to speak and thus have available an uplink channel and are found concentrated in one of the cells of the downlink iso-frequency plane.

According to a second embodiment of the invention for communications in the uplink direction, each base station of the radio communications system comprises a greater number of receivers to receive uplink carrier frequencies modulated according to a conventional modulation, for example a TETRA type π/4-DQPSK modulation. As a consequence of the increase in the number of uplink carrier frequencies, the switch has to carry out a specific allocation of said frequencies by base station in order to avoid any frequency interference between cells. In the major part of the practical implementations of the TETRA standard, the receivers of the base stations use a reception diversity system making it possible to make up for a lower transmission power of the mobile terminals. This reception diversity system also makes it possible to improve the resistance to interferences between identical carrier frequencies in different cells of the system by a factor of the order of 3 dB at least. Thus, the switch RC allocates the uplink carrier frequencies according to a tighter reuse pattern than the initial pattern, for example a reuse pattern of 9 cells per pattern and not 19 cells as proposed in the example of the first embodiment. In this case, it is possible, while respecting an equality of the frequency band allocated to the uplink carrier frequencies compared to that allocated to the downlink carrier frequencies, to allocate a double number of uplink frequencies and thus to have available a number of uplink channels which avoids any bottleneck for uplink communications. For example, with an allocation respecting a reuse pattern of 9 cells per pattern, each base station can receive six uplink carrier frequencies and have available in this case 24 uplink channels instead of 12 uplink channels according to the first embodiment.

According to a third embodiment of the invention for communications in the uplink direction, it is also possible to use a technique of frequency allocation known under the term of "voting". This technique corresponds to the allocation by the switch of a single uplink carrier frequency for a group communication in an uplink iso-frequency plane. The reception signals collected in the different cells are compared by a module known as "voter" to choose the best signal received. The "voter" module is memorised in and run by the switch RC. As a variant, the "voter" module is memorised in and run by a device connected between the switch RC and the base stations. The switch then allocates the uplink carrier frequencies according to a frequency reuse pattern per uplink iso-frequency plane. For example the use of a reuse pattern comprising 7 iso-frequency planes per pattern makes it possible to allocate 6 uplink carrier frequencies in voting mode, a seventh carrier frequency remaining allocated in a conventional manner. A number of uplink channels equal to 28 uplink channels is then obtained, which eliminates any limitation in the use of the downlink channels due to the number of uplink channels. A radio communications network may be subdivided for communications in the uplink direction into uplink iso-frequency planes, which may be different from the downlink iso-frequency planes for the communications in the downlink direction The invention and its embodiments are not limited to the examples described above. Other forms of modulation for the downlink carrier frequencies may be used, such as SAM or IOTA modulations, which are standards of the TIA.902 series normalised by the TIA (Telecom Industry Association) organisation.

Moreover, the modulation of uplink carrier frequencies may be a TETRA modulation, but also a TETRAPLO modulation or a Project 25 modulation. The invention may also consider greater width carrier frequencies such as carrier frequencies relative to WIMAX or LTE (Long Term Evolution) technology defined by the organisations IEEE (Institute of Electrical and Electronics Engineers) and 3GPP (3rd Generation Partnership Project).

Figure 4:
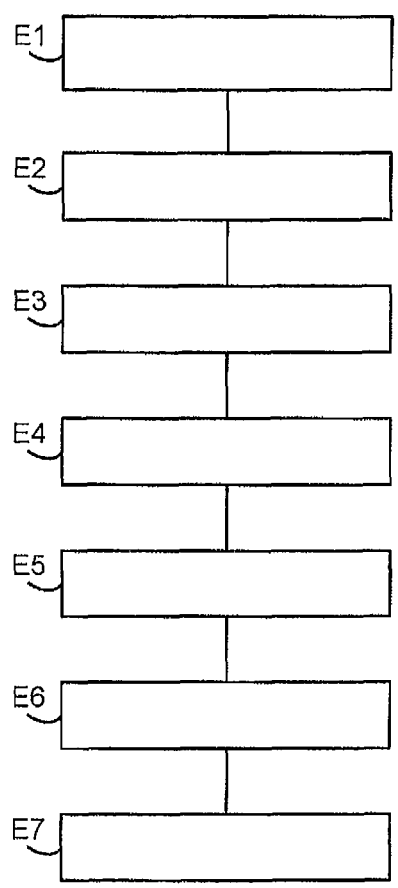
FIG. 4 is an algorithm of a method of allocation of communication channels according to the invention.

FIG. 4 represents an algorithm of the method of dynamic allocation of asymmetric channels in the radio communications system SY, according to FIG. 2, during a group communication. The method comprises the main steps E1 to E7.

At step E1, a mobile terminal TM transmits a request for establishment of a given group communication at the base station SB to which it has previously registered. The request comprises in particular an identifier of the group of mobile terminals participating in the communication. The base station SB transmits the request to the switch RC.

At step E2, the switch analyses the request received. By means of its allocation module MA, the switch selects for each cell covering the group communication an available communication channel comprised in a non-interfered uplink carrier frequency. According to the first and the second embodiment of the invention for cells covering a same group communication, the switch selects a different uplink carrier frequency per cell. According to the third embodiment of the invention, the switch selects for each uplink iso-frequency plane covering the group communication an available communication channel comprised in a non-interfered uplink carrier frequency. For uplink iso-frequency planes covering a same group communication, the switch selects a different uplink carrier frequency per plane. The carrier frequency is selected while respecting a first specific frequency reuse pattern described in one of the three preceding embodiments and memorised in the memories of the switch RC.

At step E3, by means of its allocation module MA, the switch selects for each downlink iso-frequency plane covering the communication an available downlink communication channel comprised in a downlink carrier frequency. The carrier frequency is selected while respecting a second reuse pattern per downlink iso-frequency plane memorised in the memories of the switch RC.

At step E4, the switch matches for each cell the uplink channel selected for the cell or the uplink iso-frequency plane according to one of the embodiments of the invention, and the downlink channel selected for the downlink iso-frequency plane comprising the cell. Thus, for each downlink iso-frequency plane covering a group communication, the switch can match a downlink channel to several uplink channels according to one of the embodiments of the invention.

At step E5, the controller transmits by means of the connection CX to each base station an identifier of the uplink channel and of the downlink channel that he has selected for the group communication requested.

At step E6, each base station transmits to the terminals of the communication group the identifiers so that they can synchronise the transmitters and receivers on the communication channels allocated to the group communication.

At the end of the group communication, at step E7, the switch mismatches the downlink and uplink communication channels selected for the communication in order to allocate them separately or not to other group communications.

During the establishment of a group communication, signalling sequences, in the form of control messages between the switch, the base stations and the terminals participating in the group communication, are exchanged at steps E5 and E6, containing information relative to the allocation of channels. At least one control message transmitted from the switch to each base station can contain two separate items of information for indicating an identifier of the uplink channel and an identifier of a downlink channel allocated to the base station for the group communication. The base station transmitting said message to the terminals found in the cell and participating in the communication, said terminals being synchronised on said channels to participate in the group communication. As a variant, at least two control messages may be transmitted by the switch to each base station, a first message comprising an identifier of the uplink channel, and a second message comprising an identifier of the downlink channel. The base station transmits said messages to the mobile terminals of the cell participating in the group communication.

The invention described herein relates to a method and a radio communications system in order to allocate asymmetric channels during the establishment of group communication. According to one implementation, the steps of the method of the invention are determined by the instructions of a computer programme incorporated in a switch of the radio communications system. The computer programme able to be implemented in the switch of the system of the invention comprises programme instructions which, when said programme is run in the device, the operation of which is then commanded by the running of the programme, performing an allocation of asymmetric uplink and downlink channels during the establishment of group communication according to the method of the invention.

Consequently, the invention also applies to a computer programme, particularly a computer programme recorded on or in a recording support that can be read by a computer and data processing device, adapted to implement the invention. Said programme may use any programming language, and be in the form of source code, object code, or intermediate code between source code and object code such as in a partially compiled form, or in any other form desirable to implement the method according to the invention. The programme may be downloaded in the device via a communication network, such as the internet.

The recording support may be any entity or device capable of storing the programme. For example, the support may comprise a storage means on which is recorded the computer programme according to the invention, such as a ROM, for example a CD ROM or a ROM of a microelectronic circuit, or instead or USB key, or magnetic recording means, for example a hard disk.

It will be obvious to those skilled in the art, depending on the evolution of technology, the inventive concept may be implemented in a different manner. The invention and the embodiments thereof are not limited to the examples described above but may vary while remaining within the scope of the claims.

The invention claimed is:

1. A radio communications system comprising a plurality of cells, each containing a base station and mobile terminals, said system being able to manage group communications between different mobile terminals, allocating with a first specific reuse pattern during the establishment of a group communication for each cell an uplink channel contained in an uplink carrier frequency which is different for each cell covering the group communications, the first specific reuse pattern containing a number of cells less than the number of cells of a conventional TETRA type frequency reuse pattern, and a downlink channel contained in a downlink carrier frequency, characterised in that it is able to manage a number of downlink channels per downlink carrier frequency strictly greater than a number of uplink channels per uplink carrier frequency.

2. The radio communications system according to claim 1, in which the downlink carrier frequency has a bandwidth wider than the uplink carrier frequency.

3. The radio communications system according to claim 1, comprising in each base station at least one modulator modulating each downlink carrier frequency according to a multi-carrier modulation encoding a number of bits per symbol higher than a number of bits per encoded symbol according to a modulation performed on an uplink carrier frequency by at least one modulator of a mobile terminal.

4. The radio communications system according to claim 1, in which the number of uplink carrier frequencies received by each base station is greater than the number of downlink carrier frequencies transmitted by each base station, each base station using a reception diversity system.

5. The communications system according to claim 1, comprising a switch connected to each base station of the radio communications system to dynamically allocate during the establishment of a group communication in each cell covering the group communication an uplink channel contained in an uplink carrier frequency and a downlink channel contained in a downlink carrier frequency.

6. A mobile terminal comprised in a radio communications system according to claim 1 and comprising a control unit, a human-machine interface, memories, and a communication interface, characterised in that the communication interface is able to receive a downlink carrier frequency and to transmit an uplink carrier frequency, the two carrier frequencies being asymmetric.

7. A base station of a radio communications system according to claim 1 comprising a control unit, memories, a communication interface, characterised in that the communication interface is able to receive an uplink carrier frequency and to transmit a downlink carrier frequency, the two carrier frequencies being asymmetric.

8. A method of allocation of at least one uplink channel and one downlink channel during an establishment of a group communication in a radio communications system according to claim 1, the radio communications system comprising a plurality of cells containing respectively a plurality of base stations connected to a switch, and containing respectively mobile terminals, characterised in that it comprises the following steps processed by the switch:
 a reception of a request for establishment of a group communication from a mobile terminal of the network,
 an allocation, for each cell covering the group communication, of an uplink channel comprised in an uplink carrier frequency which is different for each cell covering the group communication selected according to a first specific reuse pattern, the first specific reuse pattern containing a number of cells less than the number of cells of a conventional TETRA type frequency reuse pattern, an allocation, for each cell covering the group communication, of a downlink channel comprised in a downlink carrier frequency selected according to a second specific reuse pattern, the downlink carrier frequency comprising a number of downlink channels strictly greater than the number of uplink channels contained in the uplink carrier frequency, a matching of the uplink channel and of the downlink channel in each cell throughout the whole group communication, and a mismatching of the uplink channel and of the downlink channel at the end of the group communication.

9. The method according to claim 8, according to which the downlink channel allocated and the downlink carrier frequency selected for the group communication are identical for all cells belonging to a same downlink iso-frequency plane covering a part of the group communication, and are different for cells belonging to different downlink iso-frequency planes covering the group communication.

10. The method according to claim 8, according to which the second frequency reuse pattern is established according to a given number of downlink iso-frequency planes.

11. The method according to claim 8, according to which the uplink channel allocated and the uplink carrier frequency selected for the group communication are different for cells belonging to different uplink iso-frequency planes covering the group communication.

12. The method according to claim 8, according to which the first frequency reuse pattern is established according to a given number of uplink iso-frequency planes.

* * * * *